(12) United States Patent
Chang

(10) Patent No.: US 9,955,008 B2
(45) Date of Patent: Apr. 24, 2018

(54) METHOD FOR INTERACTING WITH A MULTIMEDIA PRESENTATION SERVED BY AN INTERACTIVE RESPONSE UNIT

(75) Inventor: Yi Chang, Saratoga, CA (US)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 846 days.

(21) Appl. No.: 12/946,085

(22) Filed: Nov. 15, 2010

(65) Prior Publication Data

US 2012/0124476 A1    May 17, 2012

(51) Int. Cl.
*H04M 3/51* (2006.01)
*G06Q 10/10* (2012.01)
*H04L 29/08* (2006.01)
*G06F 9/06* (2006.01)

(52) U.S. Cl.
CPC .......... *H04M 3/5166* (2013.01); *G06Q 10/10* (2013.01); *G06F 9/06* (2013.01); *H04L 67/02* (2013.01)

(58) Field of Classification Search
CPC . G06F 3/033; G06F 3/00; G06F 3/048; G06F 9/4446; G06F 17/30882; G06F 17/3082; H04L 67/02
USPC ........................................ 715/760, 804, 708
See application file for complete search history.

(56) References Cited

U.S. PATENT DOCUMENTS

| | | | |
|---|---|---|---|
| 5,791,907 A * | 8/1998 | Ramshaw et al. | 434/262 |
| 6,037,936 A * | 3/2000 | Ellenby et al. | 715/764 |
| 8,175,921 B1 * | 5/2012 | Kopra | G06Q 30/02 705/14.57 |
| 8,438,602 B2 * | 5/2013 | Rao | 725/89 |
| 8,682,739 B1 * | 3/2014 | Feinstein | G06Q 30/06 705/26.1 |
| 8,898,713 B1 * | 11/2014 | Price | G06F 17/30412 725/21 |
| 2002/0100063 A1 * | 7/2002 | Herigstad | H04N 7/163 725/141 |
| 2002/0140719 A1 * | 10/2002 | Amir et al. | 345/716 |
| 2002/0159464 A1 * | 10/2002 | Lewis | H04L 29/06027 370/401 |

(Continued)

*Primary Examiner* — Doon Chow
*Assistant Examiner* — Le Nguyen
(74) *Attorney, Agent, or Firm* — Lewis Roca Rothgerber Christie LLP

(57) ABSTRACT

A system for interacting with a multimedia presentation includes one or more machine-readable codes embedded in a plurality of sequential frames or in individual slides of a multimedia presentation, the frames or slides defining at least one interactive portion of a larger multimedia presentation, a touch-screen driver extension resident on a digital medium and transferable over a network to the digital medium of a touch-screen operated multi-media device, the extension enabling interpretation at the multimedia-enabled interactive response unit of touch-screen taps input during play of the multimedia presentation, and a set of machine instructions resident on a digital medium coupled to or accessible to a multimedia-enabled interactive response system, the machine instructions executable by physical interaction with the one or more of the machine-readable codes in the multimedia presentation to serve one or more additional multimedia presentations to the touch-screen multimedia device.

22 Claims, 5 Drawing Sheets

(56) References Cited

U.S. PATENT DOCUMENTS

| | | | |
|---|---|---|---|
| 2004/0017404 A1* | 1/2004 | Schileru-Key | 345/854 |
| 2008/0005652 A1* | 1/2008 | Krishnaswamy et al. | 715/500.1 |
| 2008/0034295 A1* | 2/2008 | Kulas | 715/723 |
| 2008/0066001 A1* | 3/2008 | Majors et al. | 715/758 |
| 2008/0091723 A1* | 4/2008 | Zuckerberg et al. | 707/104.1 |
| 2008/0140481 A1* | 6/2008 | Gold | 705/7 |
| 2008/0147864 A1* | 6/2008 | Drogo De Iacovo et al. | 709/226 |
| 2008/0195660 A1* | 8/2008 | Tedesco et al. | 707/104.1 |
| 2008/0244671 A1* | 10/2008 | Moon | H04N 21/4316 725/110 |
| 2008/0288596 A1* | 11/2008 | Smith | G06Q 30/02 709/206 |
| 2009/0125588 A1* | 5/2009 | Black | G06Q 10/107 709/204 |
| 2009/0144772 A1* | 6/2009 | Fink et al. | 725/42 |
| 2009/0171783 A1* | 7/2009 | Raju | 705/14 |
| 2009/0240431 A1* | 9/2009 | Chau et al. | 701/208 |
| 2009/0249225 A1* | 10/2009 | Beswick et al. | 715/756 |
| 2009/0324137 A1* | 12/2009 | Stallings et al. | 382/306 |
| 2010/0053304 A1* | 3/2010 | Underkoffler et al. | 348/42 |
| 2010/0070529 A1* | 3/2010 | Gokturk et al. | 707/780 |
| 2010/0070860 A1* | 3/2010 | Alkov et al. | 715/716 |
| 2010/0154007 A1* | 6/2010 | Touboul | G06Q 30/02 725/60 |
| 2010/0218228 A1* | 8/2010 | Walter | G06F 17/30259 725/105 |
| 2011/0093796 A1* | 4/2011 | Plummer et al. | 715/753 |
| 2011/0153403 A1* | 6/2011 | Postrel | 705/14.29 |
| 2011/0246560 A1* | 10/2011 | Gibson | G11B 27/105 709/203 |
| 2011/0246937 A1* | 10/2011 | Roberts et al. | 715/810 |
| 2012/0076367 A1* | 3/2012 | Tseng | 382/118 |

\* cited by examiner

METHOD FOR INTERACTING WITH A MULTIMEDIA PRESENTATION SERVED BY AN INTERACTIVE RESPONSE UNIT

BACKGROUND OF THE INVENTION

1. Field of the Invention

The present invention is in the field of telephony communications including data network telephony and pertains particularly to methods and apparatus for interacting with an interactive response unit in a call center.

2. Discussion of the State of the Art

In the art of telephony communications, call centers exist to handle customers for contracting businesses. Call centers often employ interactive response units for screening customers and for providing self-help menus and activities for customers who do not require live interaction with an agent of the center, or prior to routing a customer to a live agent. Interactive response units may be touch-tone operated, text operated, or voice-enabled. More recently video-enabled interactive voice response (IVR) units have been developed. These systems typically push video to the caller. Current video-enabled IVR systems provide a one-way video push from enterprise or carrier to the caller. In this system the caller may select a video for viewing, and the video-enabled IVR system pushes the video to the caller's end device. The caller may view the video or interrupt the play of the video manually, but cannot provide any interactive input that indicates the caller's interest in the video or any portion of the video. If the video is an instruction on an operation, the caller is not able to point to a specific area that she wants more video or multi-media information about.

Therefore, what is clearly needed is a method for interacting with a multimedia presentation served by an interactive response unit that enables the caller to get more detailed information about a feature in the presentation through interaction with the presentation.

SUMMARY OF THE INVENTION

The problem stated above is that automated self-help systems that are adaptive to customer changes in need are desirable for a contact center system, but many of the conventional means for interacting with customers in self-help mode such as interactive voice or touch tone response systems, also create redundancy and latency in service. The inventors therefore considered functional elements of a self-help automated interaction system, looking for components that exhibit interoperability that could potentially be harnessed to provide an automated multimedia-enabled self-help system, but in a manner that would not create redundancy and more latency.

Every automated self-help system is driven by customer interaction, one by-product of which is a number of customers who did not achieve what they wanted to achieve with the system. Most such self-help systems employ text and voice or touch tone key interfaces and logical software applications to understand the customers' needs and to route the customer requests to the correct application tree for the appropriate treatment, and interactive voice, tone, and text response systems and media servers are typically part of the apparatus.

The present inventor realized in an inventive moment that if, during customer interaction with a multimedia-enabled interactive response system, instructional multimedia information such as video or an automated slide presentation, typically pushed to the customer upon request, could be tagged or embedded with interactive linking to further more granular multimedia that is relevant to the portion of media currently being disseminated by the customer, significant reduction in redundancy and latency in service relative to obtaining additional, more detailed product or service information might result.

The inventor therefore constructed a unique customer interaction system for multimedia presentations such as video and slide shows that allowed customers to navigate to more relevant and detailed multimedia information not provided in the original multimedia, but constrained such navigation to areas or portions in the parent multimedia where more detailed information is relevant. A significant improvement in the quality of customer service results, with no impediment to call flow or system operability created.

Accordingly, in an embodiment of the present invention, a system for interacting with a multimedia presentation includes one or more machine-readable codes embedded in a plurality of sequential frames or in individual slides of a multimedia presentation, the frames or slides defining at least one interactive portion of a larger multimedia presentation, a touch-screen driver extension resident on a digital medium and transferable over a network to the digital medium of a touch-screen operated multi-media device, the extension enabling interpretation at the multimedia-enabled interactive response unit of touch-screen taps input during play of the multimedia presentation, and a set of machine instructions resident on a digital medium coupled to or accessible to a multimedia-enabled interactive response system, the machine instructions executable by physical interaction with the one or more of the machine-readable codes in the multimedia presentation to serve one or more additional multimedia presentations to the touch-screen multimedia device.

In a preferred embodiment, the system is accessed through a Website. In one embodiment the system is accessed through a telephony carrier network. In one embodiment, the one or more machine-readable codes include links to one or more multimedia presentations containing information related to but more detailed than the specific portion of the multimedia presentation interacted with. In one embodiment, the physical action is tapping on a touch screen of the receiving device in a part of the multimedia presentation the user desires more information about. In another embodiment, the physical action is key or voice input.

In one embodiment, the multimedia presentation is an instructional video or slide presentation. In one embodiment, the machine-readable codes comprise metadata that describes one or more additional multimedia presentations related to the portion of the multimedia presentation containing the code. In a variation of this embodiment, one or more machine-readable codes are embedded in one or more strategic portions in the additional multimedia presentations related to the portion of the multimedia presentation containing the original code, those machine-readable codes comprising metadata that describes one or more additional and related multimedia presentations.

According to another aspect of the present invention, a method is provided for interacting with a multimedia presentation served from a multimedia-capable interactive response unit to retrieve additional information comprising the steps (a) viewing the multimedia presentation on a connected computing device having touch-screen capability, (b) interacting via touch screen to any coded portion of the multimedia presentation that more information is desired about, (c) if coded, interpreting the action of step (b) at the multimedia-enabled interactive response unit, and (d) executing machine instruction to interrupt the previous multimedia presentation and serve one or more new multimedia presentations relative to the portion of the original multimedia presentation.

In one aspect, the method is practiced through a Website. In another aspect, method is practiced through a telephony carrier network. In a preferred aspect of the method in step (a), the multimedia presentation is an instructional video or slide presentation. In one aspect, in step (b), one or more machine-readable codes include links to one or more multimedia presentations containing information related to but more detailed than the specific portion of the multimedia presentation interacted with. In one aspect, in step (b), the interaction is tapping on a touch screen of the receiving device in a part of the multimedia presentation the user desires more information about. In one aspect, in step (b), the interaction is key or voice input.

In one aspect of the method, in step (b), one or more machine-readable codes are embedded in one or more strategic portions in the original multimedia presentation, those machine-readable codes comprising metadata that describes one or more additional and related multimedia presentations. In this aspect, in step (b), one or more machine-readable codes are embedded in one or more strategic portions in the additional and related multimedia presentations, those machine-readable codes comprising metadata that describes one or more subsequent multimedia presentations relating to the previous presentations. In one embodiment, a preliminary step is added before step (a) for selecting a specific multimedia presentation from a list of two or more offered presentation to view. In one aspect of the method, the interactive response unit detects repeated touch-screen taps in an area of the multimedia presentation that contains no metadata.

BRIEF DESCRIPTION OF THE DRAWING FIGURES

DETAILED DESCRIPTION

The inventors provide a unique system for interacting with a multimedia presentation in order to trigger one or more additional multimedia presentations providing further detail relative to the point of interaction in the original multimedia presented for interaction. The present invention is described in enabling detail using the following examples, which may describe more than one relevant embodiment falling within the scope of the present invention.

Figure 1:
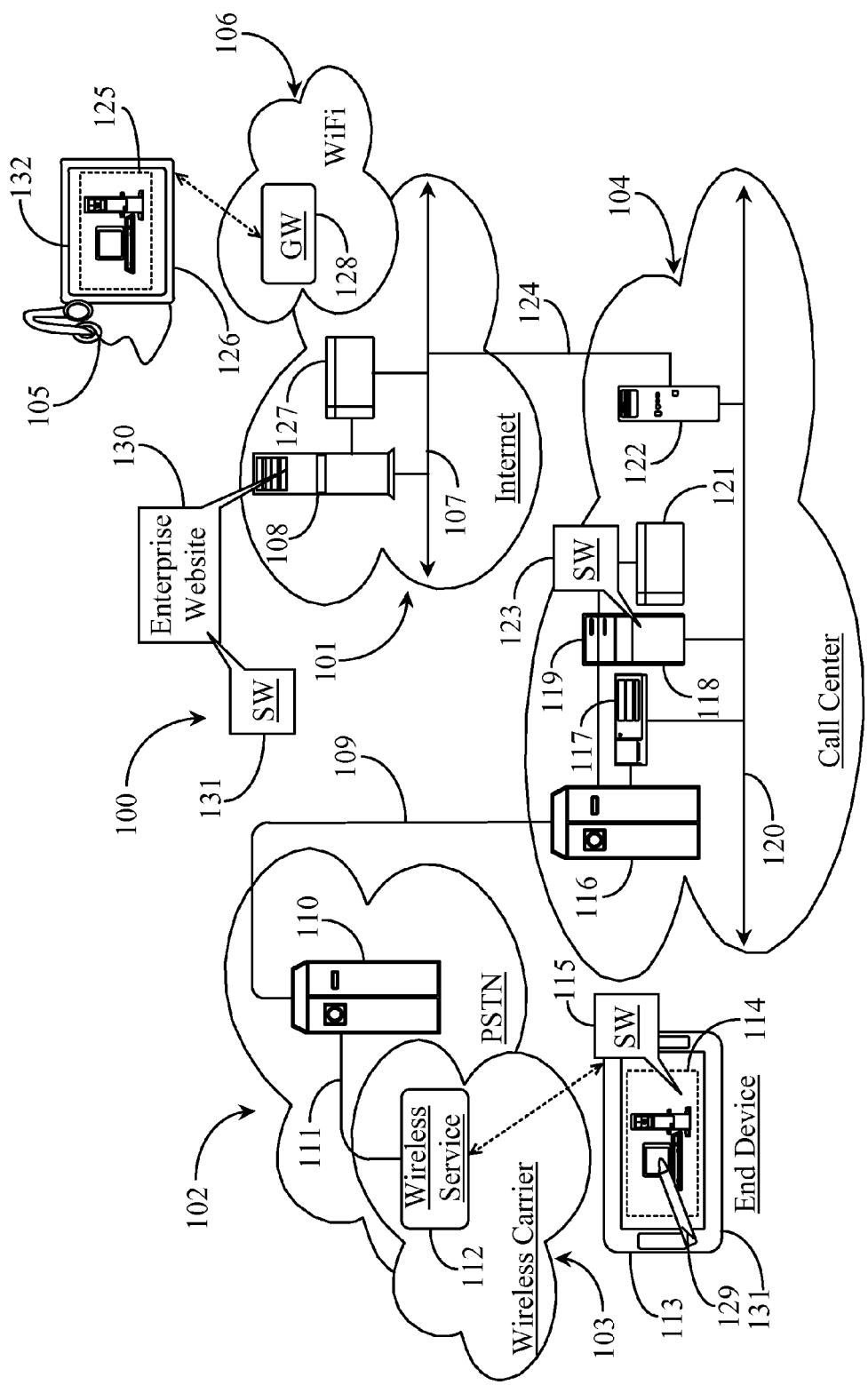
FIG. 1 is an architectural overview of a communications network supporting self-help interaction with multimedia according to an embodiment of the present invention.

FIG. 1 is an architectural overview of a communications network 100 supporting self-help interaction with multimedia according to an embodiment of the present invention. Communications network 100 includes a wide-area-network 101, which is the well-known Internet network in this example. Internet 101 may be a corporate or private wide area network instead of an Internet network without departing from the spirit and scope of the present invention. The inventors choose the Internet network for this example because of its high public-access characteristic. Internet 101 is further exemplified by an Internet backbone 107. Backbone 1207 represents all of the lines, equipment, and access points that make up the Internet network as a whole including any connected sub-networks. Therefore, there are no geographic limitations to the practice of the present invention.

Internet network backbone 107 supports an electronic information server or Web server 108. Web server 108 includes a digital medium coupled thereto or otherwise accessible that contains all of the software and data required to enable server function as a Web server. Web server 108 may be maintained by a third-party entity that provides Website hosting for enterprises. In one embodiment an enterprise maintains its own Website on server 108. Web server 108 has connection to a multimedia repository 127. Repository 127 is adapted to contain multimedia presentations for service upon request by customers interacting with a Website 118. Website 118 is a customer-access point and may be monitored for customer traffic by a call center represented herein as a call center 104.

Communications network 100 includes a public-switched-telephone-network (PSTN) 102. PSTN 102 may be a private telephone network without departing from the spirit and scope of the present invention. The inventor chooses the well-known PSTN in this example because of its high public-access characteristics. PSTN 102 includes a local telephone switch 110. Telephone switch 110 may be an automated call distributor (ACD) switch or a private branch exchange (PBX) switch or some other type of telephone switch without departing from the spirit and scope of the present invention. Telephone switch in the PSTN network has connection to a central-office telephone switch 116 within call center 104 by way of a telephone trunk 109.

Central-office switch 116 within call center 104 is computer-telephony-integrated (CTI) by way of a connected CTI processor 117. CTI processor 117 is connected to switch 116 by a CTI link. CTI processor 117 provided intelligent control over switch 116 for call center internal routing purposes. A local-area-network (LAN) 120 extending through call center 104 supports CTI processor 117. LAN 120 represents an Internet-enabled sub-network connected to Internet network backbone 107 by way of a high-speed Internet access line 124 and an Internet data router 122 connected to LAN 120. Internet router 122 is adapted to route requests incoming from Website 118 to an automated self-help system and to live agents working in the call center.

LAN 120 supports a multimedia-enabled interactive response unit 119. Interactive response unit 119 may be an interactive-voice-response (IVR) unit or it may be equipped with touchtone and or text response capability and is not limited to voice in bi-directional communications capabilities. Interactive response unit 119 is multimedia enabled as described previously, meaning that a customer may use touchtone, voice, or text response to unit voice or text prompting to request multimedia-based self-help services. In this aspect, interactive response unit 119 is adapted by a customer-service application illustrated herein as software (SW) 123 to serve one or more multimedia presentations to customer end devices that utilize touch-screen technology.

Interactive response unit 119 is connected to a multimedia repository 121 similar or identical to multimedia repository 127 connected to Web server 108. Multimedia repository 121 is adapted to store multimedia presentations for service to customers arriving at switch 116 within call center 104. In this example, call-center agents are not illustrated, as the present invention pertains to automated self-help services that might be offered to customers and potential customers of the enterprise owning Website 118, which in this example is also being serviced by call center 104.

A wireless carrier network 103 is illustrated in this example. Network 103 provides connectivity support for a wireless end device 113 operated by any customer to access call-center services through telephone interaction with switch 110 or through interaction with Website 118 hosted on server 108. End device 113 is an iPhone™ or another hand-held wireless communications device like a smart phone. End device 113 includes a touch screen 131, which may be enabled using any one of several touch-screen technologies available to the inventor. These are capacitive, resistive, and other more recently developed touch-screen technologies well known in the art and to the inventor.

End device 113 connects to a wireless connection service 112 in wireless carrier network 103 in order to access PSTN network 102, more particularly local telephone switch 110. Due to the seamless nature of data bridged between disparate networks, end device 113 may also connect to Internet network 101 through networks 103 and 102 using a network bridge like a signal seven bridge (not illustrated) or similar network bridging facility. Another end device 126 is illustrated in this example and is an iPAD™ or similar computing device that may also be operated as a communications device. End device 126 is operated using a touch screen 132. A telephony headset 105 is provided and connected to end device 126 for use in voice communications carried over the Internet network or voice over Internet protocol (VoIP).

End device 126 may connect wirelessly through a wireless network like a wireless fidelity (WiFi) network 106 having connection to Internet backbone 107 through a multimedia gateway (GW) 128. An operator may use end device 126 to access Website 118 hosted on Web server 108. Website 118 includes an interactive response application 130 that may include a touch-screen driver extension available as an automatic download from Website 118 when a customer such as one operating end device 126 invokes the application for example.

In a preferred embodiment of the present invention, multimedia presentations like video or automatic slide presentations or a mix of these are provided for customer access through a self-help interactive application accessible to customers through telephone switch 116 and interactive response unit 119, aided by software 123 or through Website 118 and a software version (SW 130) of the interactive response unit. The multimedia offerings are pre-engineered by segmenting the visible area of the presentation transparently to divide the display into multiple geometrically identical or similar segments, each representing a constant portion of a touch-screen monitor when a multimedia presentation is played on that monitor.

A multimedia presentation 125 is illustrated running on end device 126. In one embodiment such a multimedia offering is a video presentation. In another embodiment, the offering could be a PowerPoint™ slide show, for example. In either case, segmentation of the display may be transparent to the end user operating the touch-screen device. Presentation 125 includes preloaded metadata tags (not illustrated) that are placed within the video frames or on the slides of an automated presentation. The metatags are "location aware" metatags meaning that individual metatags are associated with a plurality of segments of the multimedia presentation. In presentation 125, which might be a moving video or slide presentation, the metatags may be visible or may remain invisible to the operator navigating the multimedia. A touch-screen driver extension may be sent to end device 126 from Website 118 along with the first multimedia presentation pushed to the end device from the Web equivalent of an interactive response unit exemplified as software 130 on Website 118.

The user operating end device 126 is informed by information on Website 118 that the multimedia presentation has metatags associated with certain content in the presentation, whereby those metatags define and link to one or more additional multimedia presentations that are related to the content with which the tag is associated. The metatags are associated to one or more of the display segments such that when a user touches touch screen 132 during play of multimedia presentation 125 at a segment corresponding to a metatag, the progress of the presentation will be interrupted and a subsequent multimedia presentation or presentation menu is pushed to the device based on the information contained in the metatag. The subsequent multimedia presentation is, in a preferred embodiment, related to the content in the original multimedia presentation that was in display at the time the user touched the touch screen during play of the presentation. In one embodiment there are touch requirements such as touching the screen repeatedly (two to several taps).

In practice, the user operating end device 126 connects online to Website 118 and invokes software 130. Software 130 executes to connect the user to a voice or text-based interactive response unit. For purposes of discussion, it is assumed that the interactive response function may be provided in and accessed through Website 118. A voice enabled interactive response unit may prompt the customer operating device 126 with a general needs question such as "How may we help you?" The customer knowing the application is a self-help application selects a multimedia presentation that he or she thinks will be of most help to them in solving a particular need or problem they are having, for example, with a computer system they purchased from the company.

The website interactive response application serves a multimedia presentation 125 to end device 126 for consumption. Presentation 125 may be a video explaining basic assembly of a computer system for example. In the display, a monitor and a computer tower are visible. A touch-screen driver extension is sent to the device along with the video presentation and installs and activates itself before the video plays. If while watching the video, the customer repeatedly taps on a part of the monitor screen, the touch-screen driver extension detects the activity and determines the segment location where the activity occurred. The extension then determines if any metatags are associated with that segment during the time of play that the user touched the screen. In other words the system marks the user's area of interest in the multimedia presentation and then sends more detailed multimedia or other documentation to the end user.

In one embodiment, the invention is practiced over the telephone network including any connected sub networks to the PSTN network. In this case a user operation end device 113 would place a telephone call to telephone switch 116 using wireless service 112, switch 110 and trunk 109.

Interactive response unit 119, which may be voice-enabled (IVR) intercepts the caller at switch 116 and screens the caller. If the caller is vying for automated self-help, he or she is routed to unit 119. Application 123 serves a menu with multimedia selections for the caller to choose from. The multimedia for service is contained in repository 121. The caller selects a multimedia presentation and it is pushed over the telephone connection to end device 113. A touch-screen driver extension (SW 115) is also served to the device as an installable download similar to a codec or active X control.

In this example multimedia presentation 114 appears and plays on the end device 113. The user, operating device 113, is using a stylus 129 for touch-screen activation. The user is repeatedly touching the display screen over a computer monitor next to a computer tower in the presentation. SW 115 detects the touch-screen activity and associates it with a segment of the display that at the time of the activity is over the monitor component of the computer system that the multimedia presentation is based upon. The installation of a touch-screen driver extension application may be a permanent installation so that the next time the user accesses multimedia self-help from Website 118 or from interactive response unit 119, no driver extension need be downloaded. In another embodiment it is a temporary installation that only works for one session with a parent multimedia presentation and subsequent more detailed presentations that may be served after the touch-screen activity is analyzed.

In this example, the metatags are embedded into the picture frame data or slide data of the multimedia presentation and are simply "associated" with specific display segments geographically defined in the presentation display. Therefore, a touch-screen driver is required to interpret any touch-screen activity that occurs after the time of play. The system records the start time and knows the run time of each presentation. In this way the activity can be associated with a specific start point in the run-time of the multimedia. The length of the touch-screen activity might vary according to what the system expects from the user.

For example, it may be stated that the user should repeatedly tap on an area of interest in the presentation. In this case the length of the activity might occur over many frames if video, for example, and may also encompass one or more metatag-associated segments. The touch-screen driver extension notices when the activity begins and which segment or segments are being tapped on the display area. Thus the system knows which video frames were involved in the activity and which metatags to execute to retrieve the additional media or media menu.

In one embodiment, the multimedia presentations are pre-engineered with hypertext anchors or anchor text that is embedded in the video data as a visible text overlay that is ordered to display relative to a number of video frames required to enable user visualization of the anchor or hypertext. In this embodiment, the user would see certain text such as click here to learn more. The user would tap the text anchor to interrupt play of the current presentation and order an additional presentation or presentation menu based on the non-visible content of the anchor text. In this case that tag has to be repeated in enough frames of the presentation so the user can view and have time to interact with the anchor. In a slide presentation, the anchor or tag for a monitor, for example, may be visible wherever the monitor is visible in the presentation. Clicking on the monitor in the display sends a ping back to the interactive response unit to serve the more-detailed presentation about the monitor.

Figure 2:
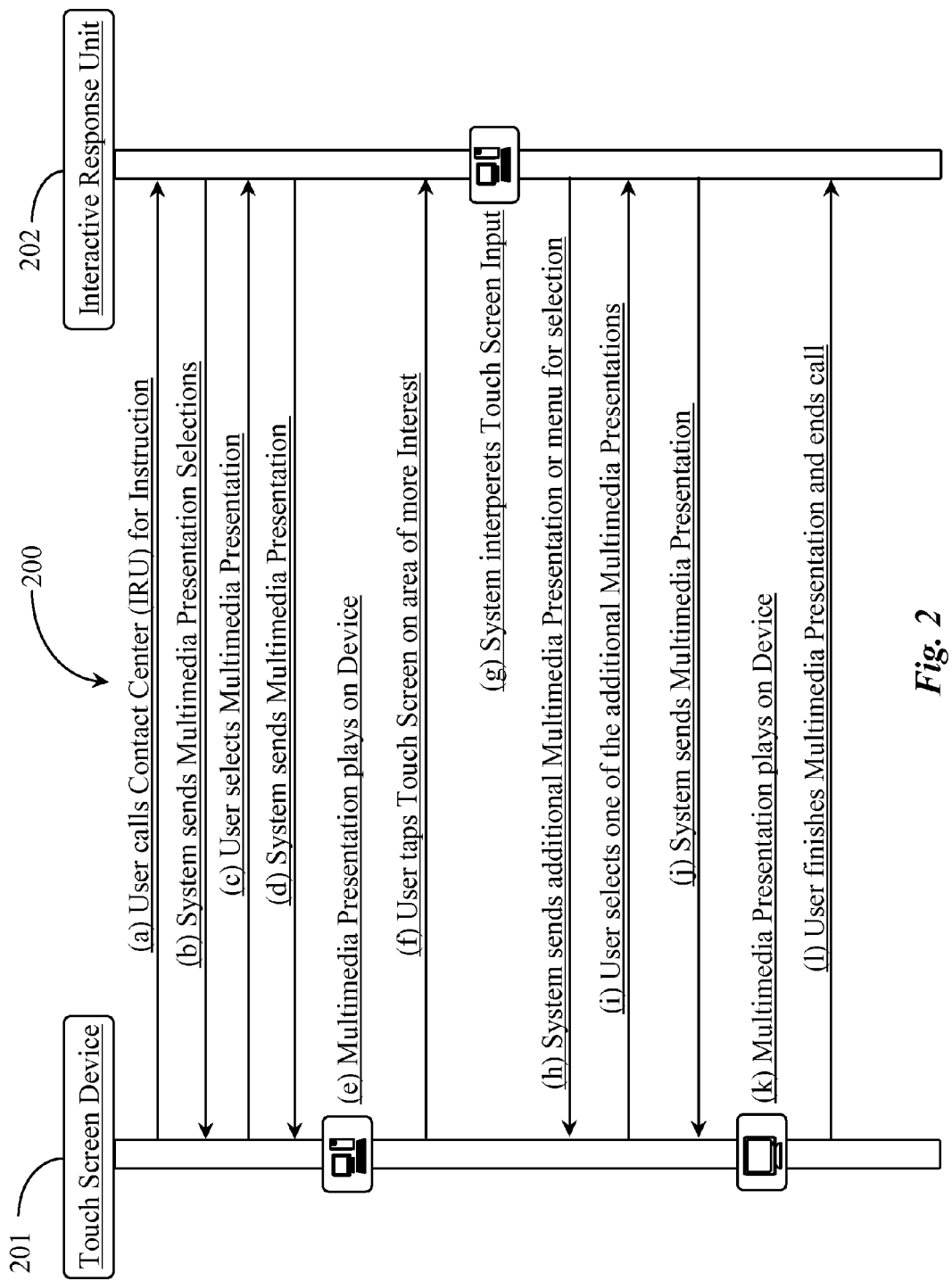
FIG. 2 is a unified markup language chart illustrating interaction between a customer and a multimedia-enabled interactive response unit according to the embodiment of FIG. 1.

FIG. 2 is a sequence chart 200 illustrating interaction steps between a customer and a multimedia-enabled interactive response unit according to the embodiment of FIG. 1. A touch-screen device 201 is illustrated and is in constant session with an interactive response unit 202 in this example. Generically speaking, at step (a) a user operating the touch-screen device calls into the contact center interactive response unit 201 for instruction or help. It is assumed that the user knows it is a self-help number.

The system responds at step (b) to the user by sending a menu of multimedia presentation selections to choose from. The user then responds at (c) by selecting a multimedia presentation to view. The system responds the user selection at step (d) by sending the selected multimedia presentation for viewing. The multimedia presentation plays on the touch-screen device automatically. During play, the user sees a portion of the presentation that he or she wishes more detailed information about and taps repeatedly on the touch screen at step (f) over the area of interest. During this act the user sees the component or facet of the overall presentation that sparked more interest and that resulted in the taps over that displayed feature of the presentation.

The system responds by interpreting the touch-screen taps at step (g), equating the input to one or more metatags defining one or more related multimedia presentations. The system then sends the more-detailed multimedia presentation related to the metatag activated by the previous tapping on the touch screen. In one embodiment, the system sends a menu in the case of more than one relevant multimedia presentation available. The user responds by selecting at step (i) the presentation to play from the menu, or confirming if only one option is available.

The system responds by sending the additional multimedia presentation. The additional presentation may be a more-detailed presentation covering aspects of the component that the user was interested in learning more about. The multimedia presentation plays on touch-screen device 201 at (k), giving the user all of the information the user wanted to know. The user may respond by finishing view of the multimedia presentation and terminating the call.

In one embodiment, the additional multimedia presentations are tagged relative to components that can be described in yet more detail. During play the user has the option of interacting with these whether visible or not in the interface. In one embodiment the system is adaptive in that if the user taps on a portion of the display that is not tagged, then a multimedia presentation like a generic under construction clip might be sent for viewing letting the user know that eventually there may be more relevant data there. If many users are tapping the same untagged segments in the same presentation over time, the system may order a new more-detailed multimedia presentation to be created that can be linked to that segment or segments in the previous presentation.

In a use case example, a multimedia presentation showing a computer package of a monitor, a tower, and a keyboard might be sent to a user calling into a video-enabled IVR, for example. If the user taps on the touch screen over the monitor area where it is tagged during playback of the video, the system will send a more-detailed monitor video as the next presentation for viewing. The monitor video may also be tagged such as an area tagged for display, an area tagged for control panel, and an area tagged for base adjustment. The user may then touch the area of the monitor video relative to base adjustment. This action will result in a video about how to adjust the base of the monitor being sent to the user in the next response from the system. In this example, additional multimedia content tagged in the original multimedia is more detailed and provides the user with further detail about an overall system or product.

The present invention bodes well for instructional videos that can be ordered in such an interactive way that no additional overhead is incurred by the call-processing system. In one embodiment of the present invention, additional multimedia presentations are videos about competing products or services instead off presentations offering more detail about a product or service feature.

Figure 3:
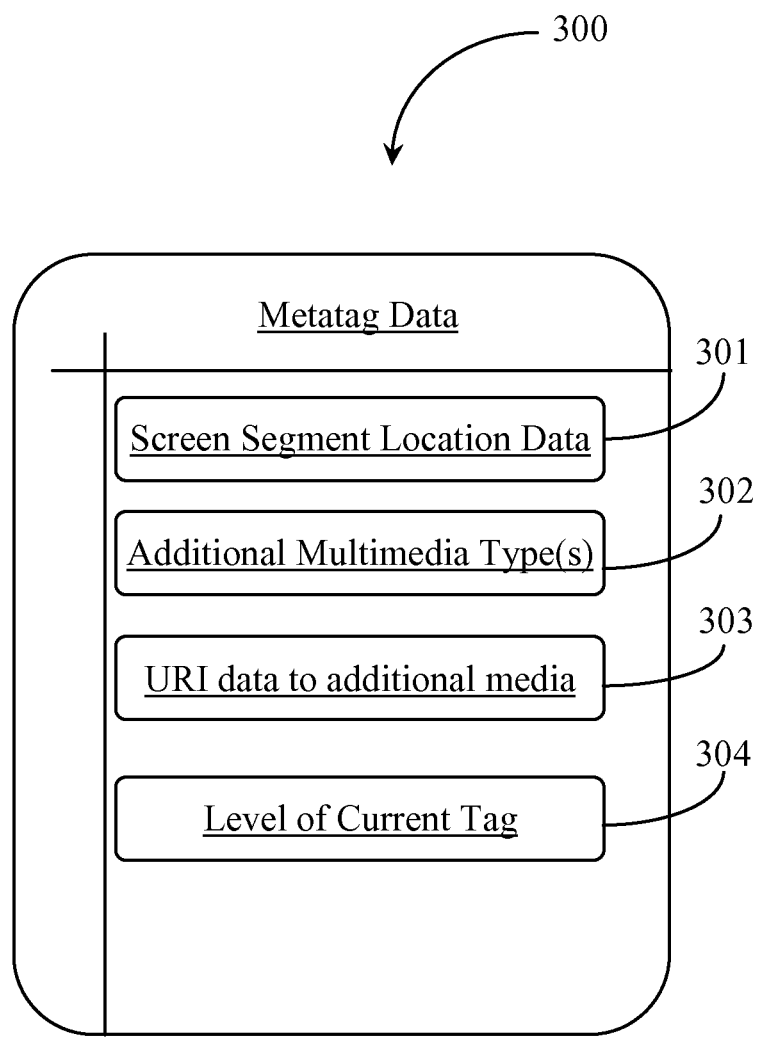
FIG. 3 is a block diagram illustrating basic elements of a metadata tag used for triggering more detailed multimedia for viewing and potential further interaction.

FIG. 3 is a block diagram 300 illustrating basic elements of a metadata tag used for triggering additional multimedia for viewing and potential further interaction. Block diagram 300 logically represents a metatag showing some basic components. Each metatag has location data 301 pointing to the area on the screen that the tag represents. For example, a metatag may represent just one segment of the divided screen area or it may represent more than one segment of the screen area. The system knows what content is visible in any given tagged segment or segments comprising an area where a user may repeatedly touch the screen triggering one or more tags.

Metatag 300 includes data 302 that describes what additional multimedia types might be linked to a specific segment or area of the display during multimedia playback. For example, a metatag may link to a menu that provides a selection of media type for viewing a next multimedia presentation. For example, the menu might offer the user a choice between viewing and possibly interacting with a video, or perhaps viewing and interacting with a PowerPoint slideshow.

Metatag 300 includes link data 303. Data 303 provides a database location for the menu or additional multimedia that will be delivered to a user based on interaction with the tag. In this embodiment a universal resource indicator is provided. A universal resource locator (URL) and other link information may be provided without departing from the spirit and scope of the present invention. The universal resource indicator (URI) may be a link to a single multimedia presentation for retrieval by the system for the user. The URI may be a link to a menu that will provide further linking to two or more selectable presentations that might be the same presentation in different formats, in one example.

Metatag 300 includes a tag level indicator 304. The level of a tag simply informs the user if there are any more tags under it in the additional media. For example, a tag repeatedly tapped will send a message to the server to return the additional media or menu that is a target for the tag. If the additional media also has further metatags the user may be informed so that he or she may skip ahead to the most detailed presentations without bothering to completely view the current multimedia presentation.

Other data might also be embedded in the metatag without departing from the spirit and scope of the present invention. In one embodiment, pop-up advertising is embedded into the tag and plays whenever a tag is triggered in the period of time that the user is waiting for the next multimedia presentation. Other types of announcements and information may also be piggybacked to the metatag such as mentioning current events at the business, announcing new products, announcing new news events, and so on. There are many different possibilities.

In one embodiment tags are actually embedded in the playback stream of the video and appear in the video display for selection by touch screen method. In a variation of this embodiment the tags are transparent to the user and the user simply touches an area of more interest in a multimedia presentation whether it is tagged or not. In one embodiment the tags are included with the presentation data and are activated by association, meaning that user touching of the screen in a tagged area is interpreted as tag activation. In this aspect a touch screen diver extension is provided to record the touch activity of the user during the playback of the multimedia on the user's end device.

Figure 4:
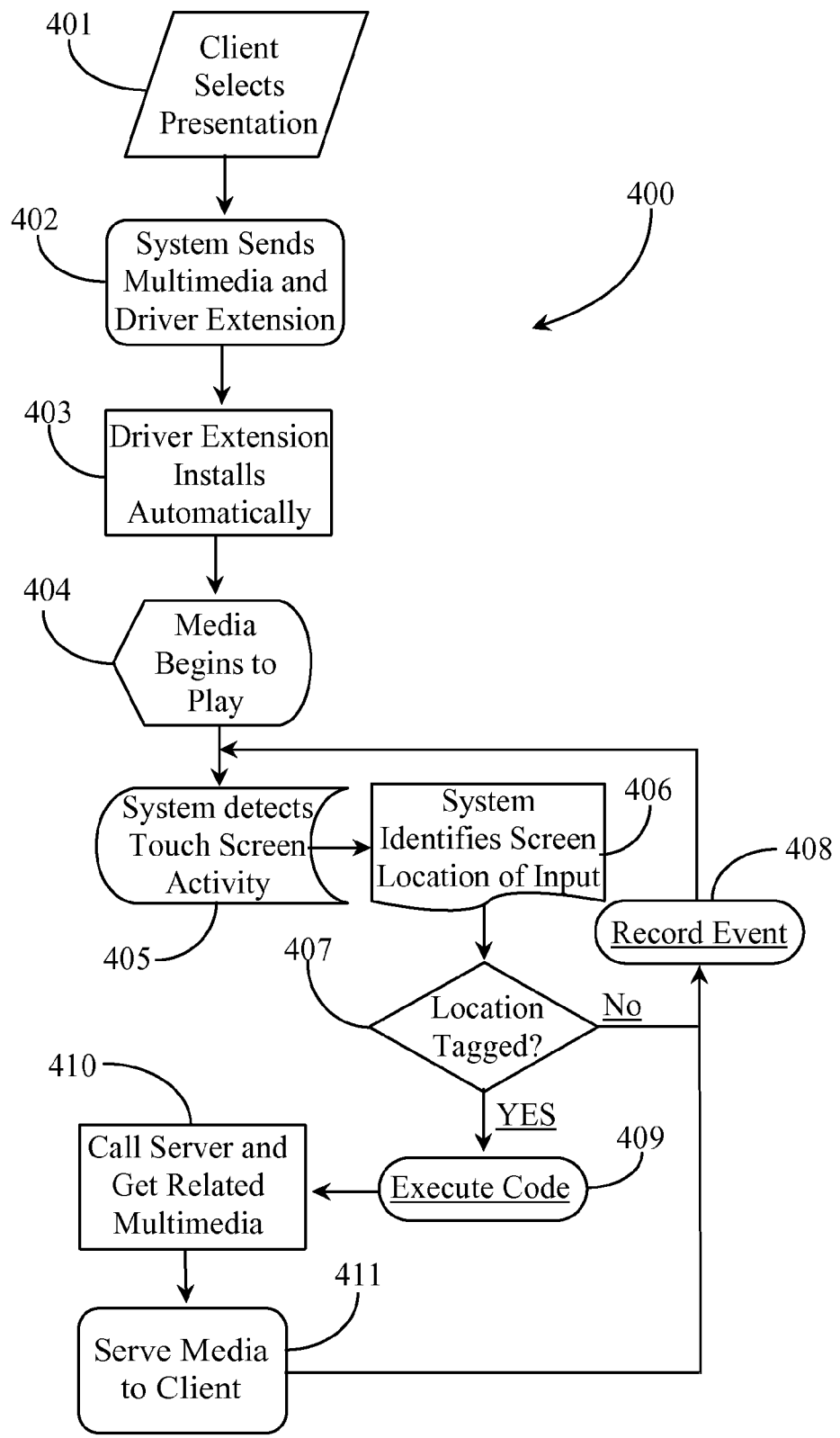
FIG. 4 is a process flow chart illustrating steps for enabling a touch screen communications device for multimedia self-help service according to the embodiment of FIG. 1.

FIG. 4 is a process flow chart 400 illustrating steps for enabling a touch-screen communications device for multimedia self-help service according to the embodiment of FIG. 1. At step 401, a client selects a multimedia presentation during interaction with an interactive response system like a video-enabled interactive voice response system for example. A step 402, the system sends the multimedia presentation selected by the user and also sends, in one embodiment, a touch-screen driver extension to enable the system to interpret touch-screen activity during playback of the multimedia presentation. In one embodiment the multimedia presentation is a video. In another embodiment the multimedia presentation is an automated slide show.

A step 403, the touch-screen driver extension sent to the user at step 402 along with the multimedia presentation, installs automatically in the background. The installation is transparent to the user. At step 404, the original multimedia presentation begins to play automatically. In one embodiment, the user may have the ability to manually start, stop, pause, and replay the presentation using touch screen input. During playback, the system aided by the touch-screen driver extension, detects touch-screen activity by the user at step 405. In a preferred embodiment, the user touches an area of the visual playback screen of the presentation corresponding to an item of further interest in the multimedia presentation currently occupying that area of the screen. The pattern of touch required to navigate to more detailed media might be known to the system and to the user such as multiple repeated taps so as not to confuse the activity with normal touch screen input activity like stopping play, rewinding, volume control, and other normal one or two-touch screen activities.

The system determines the location of the touch screen input at step 406, such as which segment or segments of the visible screen area was tapped repeatedly. At step 407, the system makes a determination whether the segment or segments were tagged. If at step 407 the system determines that the touch-screen activity has occurred in an area of the screen that was not tagged, the system records and time stamps the event at step 408. The system then returns to monitoring for new touch-screen activity. By recording the event even though it was not a tagged event, the system makes a record of repeated taps over specific areas of the presentation by many users. This statistical analysis lends to possible conclusion that there should be some more detail offered for that particular feature of the product that is eliciting the extra taps by users.

If the system determines at step 409 that the tapped location is tagged, the system executes the tag or performs a next action based on the tag structure. In this example, the system calls the multimedia server at step 410 and gets the related multimedia presentation for service to the user. In one embodiment there are more than one multimedia selection that the tag points to so an interactive menu may be served instead of a next presentation. In another embodiment only a single presentation is linked to the executed tag so that presentation is immediately served at step 411. The process then resolves to step 408 whereupon the system records the event. The process then resolves back to monitor for new touch-screen activity relative to playback of the next multimedia presentation. The process may loop until there are no more tags to execute, or until the user terminates the interaction with the interactive response system. In one embodiment the only activity a user may engage in during playback of a multimedia presentation is tapping on an area of the screen depicting a product feature in which more detail is desired by the user. If at this point the system sends a menu the user may then interact with that menu.

Figure 5:
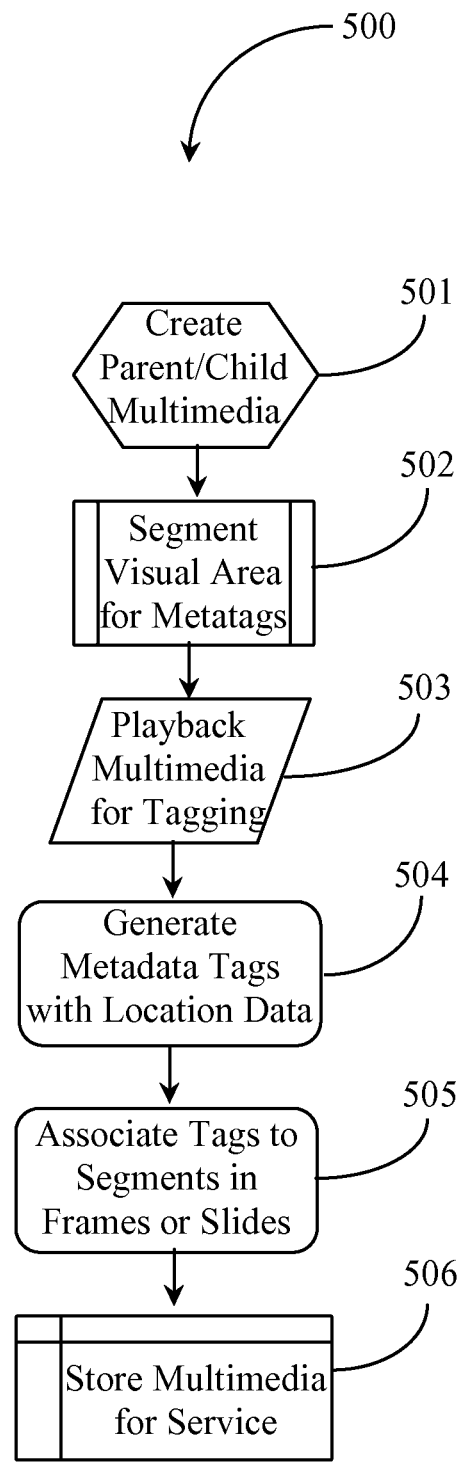
FIG. 5 is a process flow chart illustrating steps for preparing multimedia with embedded metatags.

FIG. 5 is a process flow chart 500 illustrating steps for preparing multimedia with embedded metatags. At step 501, a knowledge worker or other authorized personnel creates or obtains a multimedia presentation that will serve as a parent presentation. During the same step, the creator may also create or obtain the child multimedia presentation or presentations that will be linked to the parent presentation but one level down in hierarchy.

At step 502, the knowledge worker, using a graphics-editing program, segments the visual display area of the multimedia presentation into areas that might be associated with metatags when certain content is displayed in the original video or multimedia presentation. At step 503 the knowledge worker plays back the multimedia for tagging. At step 504 the knowledge worker with the aid of a graphics-tagging application generates metadata tags with location information to tag the data to a specific segment of segments of the screen at specific parts in the original presentation. The segments are associated to certain frames if video or to certain slides if an automated slide presentation at step 505. At step 506, the multimedia presentations are stored for service in a multimedia-enabled data repository.

In one embodiment anchor text or hypertext tags are embedded into the video display and are visible to the end user to touch if the user needs more detailed information about the subject matter the tag is hovering over in the multimedia presentation. In another embodiment, the metatags are installed in video frames of the video or as associated data tags related to particular slides in a multimedia presentation. In this embodiment a touch-screen driver extension is provided to indicate to the system which segment or segments of the presentation are being repeatedly tapped to cause more detailed multimedia to be presented to the user.

In one embodiment the tags include URL and URI data indicating where on the network the associated media is located online (server repository) or in a connected database. In this case, tapping directly on a link may invoke the link automatically causing the interactive response system to serve up the next media presentation while interrupting or stopping play of the existing multimedia presentation. In one embodiment, additional multimedia selections tied to a parent video or slide presentation also include metatags within them for enabling a user to get even more detailed granularity.

In one embodiment of the present invention, child media presentations may have tags that cause a system to loop back to the original presentation. For example, a user might invoke a tag to get a more detailed monitor video during play of an original video. After viewing the more detailed multimedia the user may touch the screen over a part that causes the original video to start again or to play again where it originally was interrupted. In one embodiment a user may set certain preferences such as "make tags visible during playback". If the interactive response system supports full browser navigation, then the tags might be links directly to other multimedia presentations that are invoked to be served to the user's end device and play automatically resulting from the tapping exercise. There are many configurable embodiments for the interactive response system.

It will be apparent to one with skill in the art that the multimedia tagging and presentation system of the invention may be provided using some or all of the mentioned features and components without departing from the spirit and scope of the present invention. It will also be apparent to the skilled artisan that the embodiments described above are specific examples of a single broader invention, which may have greater scope than any of the singular descriptions taught. There may be many alterations made in the descriptions without departing from the spirit and scope of the present invention.

What is claimed is:

1. A system for providing interactive multimedia content to display devices comprising:
    a processor;
    a memory, wherein the memory has stored thereon instructions that, when executed by the processor, causes the processor to:
        send a first multimedia presentation over a data communications network, the first multimedia presentation including assistance information associated with a product or service and having a first segment corresponding to a feature of the product or service and associated with a first metadata tag and a second segment associated with no metadata tags, where the first metadata tag identifies a second multimedia presentation that includes more detailed assistance information relating to the feature of the product or service to which the first segment corresponds;
        detect user selection, by a first user, of the first segment of the first multimedia presentation based on identifying a time of the user selection after start of playback of the first multimedia presentation;
        retrieve the first metadata tag in response to detecting the user selection of the first segment;
        identify the second multimedia presentation identified by the first metadata tag;
        transmit the second multimedia presentation identified by the first metadata tag to a display device associated with the first user;
        detect user selection, by the first user, of the second segment of the first multimedia presentation;
        determine that the selected second segment is associated with no metadata tags;
        in response to determining the selected second segment is associated with no metadata tags, generate an order for creating additional multimedia material corresponding to the selected second segment;
        after generating the order, send the first multimedia presentation over the data communications network with the second segment being associated with a second metadata tag;
        detect user selection, by a second user, of the second segment of the first multimedia presentation;
        retrieve the second metadata tag in response to the user selection of the second segment of the first multimedia presentation by the second user; and
        transmit a third multimedia presentation identified by the second metadata tag to a display device associated with the second user for display thereby.

2. The system of claim 1, wherein the first and second multimedia presentations are sent over at least one of a telephone network via an interactive voice response unit, and an internet network via a website.

3. The system of claim 1, further comprising a multimedia repository configured to store the first and second multimedia presentations.

4. The system of claim 1, wherein the instructions further cause the processor to replace the playback of the first multimedia presentation with playback of the second multimedia presentation.

5. The system of claim 4, wherein the second multimedia presentation comprises a third metadata tag configured to resume the playback of the first multimedia presentation in response to user interaction with a segment of the second multimedia presentation associated with the third metadata tag.

6. The system of claim 1, wherein the tag is associated with a plurality of segments of the first multimedia presentation.

7. The system of claim 1, wherein, in response to the user selection with a segment not associated with the tag, the instructions further cause the processor to record the user selection.

8. The system of claim 1, wherein the first multimedia presentation is a video presentation, and the segment is associated with a particular video frame of the video presentation.

9. The system of claim 8, wherein the tag associated with the segment of the first multimedia presentation is embedded in the particular video frame of the first multimedia presentation.

10. The system of claim 1, wherein the instructions further cause the processor to determine whether the tag includes a tag level indicator, wherein the tag level indicator dictates whether there are a plurality of multimedia presentations associated with the tag.

11. The system of claim 10, wherein the instructions further cause the processor to send a menu to the display device associated with the first user in response to detecting the tag level indicator, wherein the menu comprises links to the plurality of multimedia presentations.

12. The system of claim 11, wherein the second multimedia presentation is one of the plurality of multimedia presentations, the second multimedia presentation being selectable via the menu.

13. The system of claim 1, wherein the multimedia presentation is a video having a plurality of video frames, and user selection of the first segment occurs over the plurality of video frames, wherein the instructions further cause the processor to:
in response to the user selection over the plurality of video frames, identify a plurality of segments of the first multimedia presentation and identify a plurality of tags associated with the plurality of segments.

14. The system of claim 1, wherein the tag is associated with a particular product displayed in the multimedia presentation, wherein the instructions further cause the processor to:
visually display the tag on a display monitor whenever the particular product is displayed in the multimedia presentation.

15. A method for providing interactive multimedia content to display devices comprising:
sending, by a processor, a first multimedia presentation over a data communications network, the first multimedia presentation including assistance information associated with a product or service and having a first segment corresponding to a feature of the product or service and associated with a first metadata tag and a second segment associated with no metadata tags, where the first metadata tag identifies a second multimedia presentation that includes more detailed assistance information relating to the feature of the product or service to which the first segment corresponds;
detecting, by the processor, user selection, by a first user, of the first segment of the first multimedia presentation based on identifying a time of the user selection after start of playback of the first multimedia presentation;
retrieving, by the processor, the first metadata tag in response to detecting the user selection of the first segment;
identifying, by the processor, the second multimedia presentation identified by the first metadata tag;
transmitting, by the processor, the second multimedia presentation identified by the first metadata tag to a display device associated with the first user;
detecting, by the processor, user selection, by the first user, of the second segment of the first multimedia presentation;
determining, by the processor, that the selected second segment is associated with no metadata tags;
in response to determining the selected second segment is associated with no metadata tags, generating, by the processor, an order for creating additional multimedia material corresponding to the selected second segment;
after generating the order, sending, by the processor, the first multimedia presentation over the data communications network with the second segment being associated with a second metadata tag;
detecting, by the processor, user selection, by a second user, of the second segment of the first multimedia presentation;
retrieving, by the processor, the second metadata tag in response to the user selection of the second segment of the first multimedia presentation by the second user; and
transmitting, by the processor, a third multimedia presentation identified by the second metadata tag to a display device associated with the second user for display thereby.

16. The method of claim 15, wherein the first and second multimedia presentations are sent over at least one of a telephone network via an interactive voice response and an internet network via a website.

17. The method of claim 15, wherein the first and second multimedia presentations are stored on a multimedia repository.

18. The method of claim 15 further comprising replacing, by the processor, the playback of the first multimedia presentation with playback of the second multimedia presentation.

19. The method of claim 18, wherein the second multimedia presentation comprises a second tag configured to resume the playback of the first multimedia presentation in response to user interaction with a segment of the second multimedia presentation associated with the second tag.

20. The method of claim 15, wherein the tag is associated with a plurality of segments of the first multimedia presentation.

21. The method of claim 15 further comprising, in response to the user selection with a segment not associated with the tag, recording the user selection by the processor.

22. The method of claim 15, wherein the first multimedia presentation is a video presentation, and the segment is associated with a particular video frame of the video presentation.

* * * * *